United States Patent [19]

Wikdahl

[11] 4,070,171

[45] * Jan. 24, 1978

[54] APPARATUS FOR THE SEPARATION OF GAS MIXTURES INTO COMPONENT FRACTIONS ACCORDING TO THEIR MOLECULAR OR ATOMIC WEIGHT

[76] Inventor: Nils A. L. Wikdahl, Bravallavaglen 42, 182 64 Djursholm, Sweden

[*] Notice: The portion of the term of this patent subsequent to July 24, 1990, has been disclaimed.

[21] Appl. No.: 672,377

[22] Filed: Mar. 31, 1976

Related U.S. Application Data

[60] Continuation-in-part of Ser. No. 655,045, Feb. 4, 1976, abandoned, which is a continuation of Ser. No. 522,805, Nov. 11, 1974, abandoned, which is a continuation-in-part of Ser. No. 353,288, April 23, 1973, abandoned, which is a continuation-in-part of Ser. No. 53,712, July 10, 1970, abandoned, and a continuation-in-part of Ser. No. 353,148, April 20, 1973, abandoned, which is a division of Ser. No. 53,712, July 10, 1970, abandoned, and a continuation-in-part of Ser. No. 72,951, Sept. 17, 1970, Pat. No. 3,747,306.

[51] Int. Cl.² ............................................. B01D 45/12
[52] U.S. Cl. ........................................ 55/419; 55/345; 55/459 R
[58] Field of Search ................... 55/17, 261, 459, 345, 55/419; 233/DIG. 1, 27

[56] References Cited

FOREIGN PATENT DOCUMENTS 461,783 1/1973 Australia.

*Primary Examiner*—Bernard Nozick

[57] ABSTRACT

An apparatus is provided for separation of gas mixtures into component fractions according to their molecular or atomic weight, comprising a housing having a separator chamber therein that is circular in cross-section, has an apex end and a base end, and a diameter at the base end of at most 5 mm. A gas inlet at the base end is arranged for tangential flow of gas into the chamber, to establish a vortical gas flow from the base end towards the apex end. Gas outlets in the housing at the base end and the apex end are in axial alignment, the apex end outlet receiving peripheral vortical gas flow, and the base end outlet receiving core vortical gas flow, the lower molecular or atomic weight components being concentrated in the core flow, and the higher molecular or atomic weight components being concentrated in the peripheral flow, due to the centrifugal force applied in the vortex.

18 Claims, 4 Drawing Figures

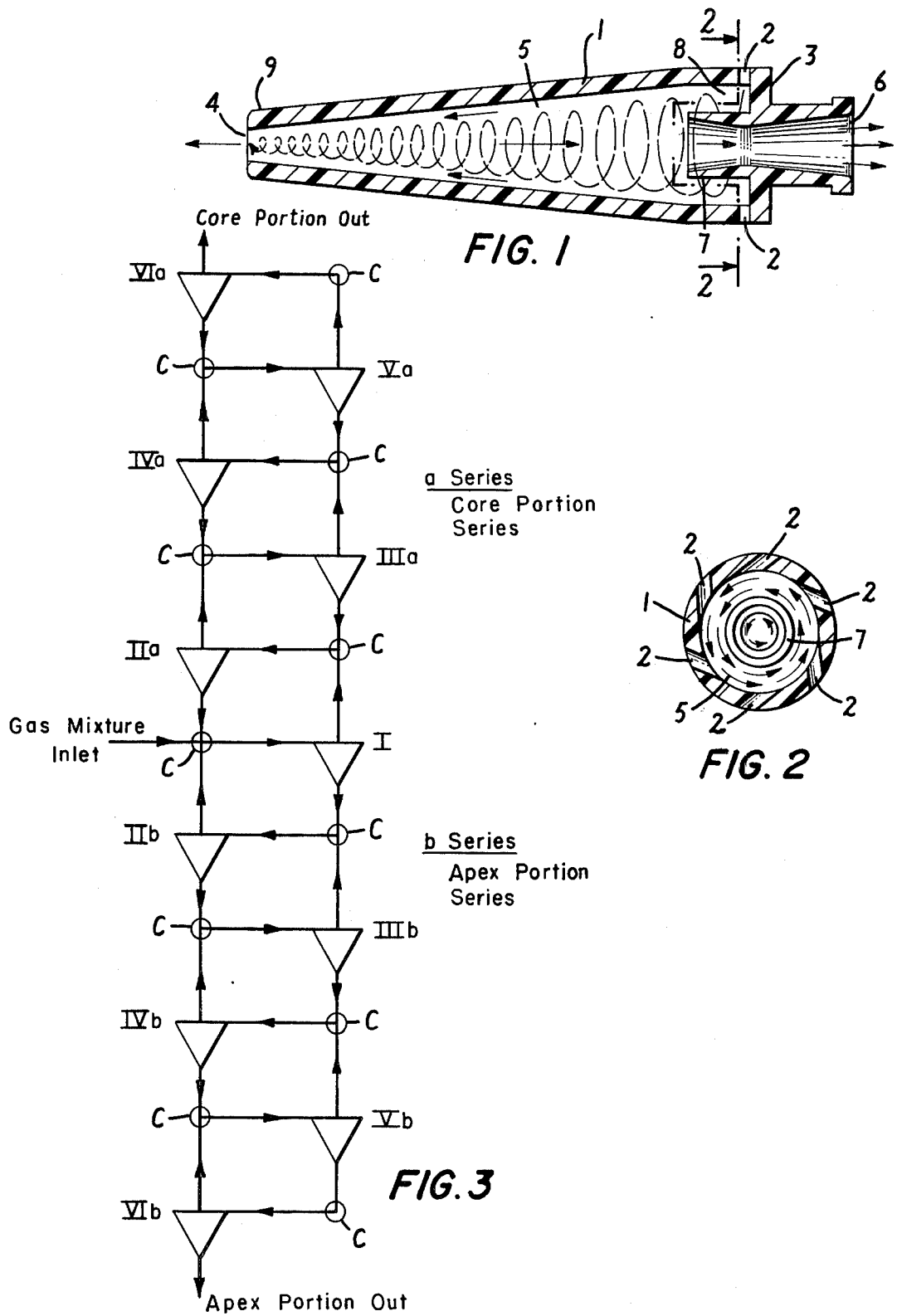

APPARATUS FOR THE SEPARATION OF GAS MIXTURES INTO COMPONENT FRACTIONS ACCORDING TO THEIR MOLECULAR OR ATOMIC WEIGHT

This application is a continuation-in-part of Ser. No. 655,045 filed Feb. 4, 1976, which in turn is a continuation of Ser. No. 522,805 filed Nov. 11, 1974, which in turn is a continuation-in-part of Ser. No. 353,288, filed Apr. 23, 1973, which in turn is a continuation-in-part of Ser. No. 53,712, filed July 10, 1970, and of Ser. No. 353,148, filed Apr. 20, 1973, which in turn is a division and containing additional subject matter of Ser. No. 53,712, filed July 10, 1970, all of these applications now being abandoned, and a continuation-in-part of Ser. No. 72,951, filed Sept. 17, 1970, now U.S. Pat. No. 3,747,306, issued July 24, 1973.

Methods for the separation of gas mixtures into component fractions according to their molecular or atomic weight are easy to devise in principle, but in practice rather difficult to reduce to or embody in the form of a workable apparatus. Because the components differ in molecular weight, they can be separated according to mass. Because the molecules or atoms are different, it is also possible to separate them by applying an electric or magnetic field, and taking advantage of the different response of different types of molecules or atoms to such fields. Thus, for example, isotopes of particular nuclear spin can be singled out, provided an atomic beam of the element in question can be produced, and the atoms have a non-zero electronic spin in the ground state. Other arrangements acting on ion beams are possible, such as mass filters, which make use of the focusing action on ions of an electric quadrupole field. As superimposed high frequency field brings ions of one particular mass into resonance, and throws them out of the beam. Electric fields are more easily maintained than magnetic fields, and an array of many beams operating in parallel can easily be arranged. However, these are only laboratory methods, and are not suitable for use on a large scale, because of the cost and equipment needed.

The difference in mass gives rise to a difference in diffusion rate, and this has been utilized commercially in the separation or enrichment of isotopes, especially of uranium. The mixture of gases is caused to impinge on a porous membrane in which the pores are small enough for molecular flow to take place, and so the lighter molecules pass more readily through the pores than the heavier ones. The mixture can thus be separated by flowing it along the membrane surface; the portion that passes through is enriched as to the lighter component, and the portion that does not is enriched as to the heavier component. In the case of U 235 and U 238, the fractional change in the concentration of the two isotopes is very small, so many separation stages are needed.

The gas centrifuge uses a rotating cylinder with annular entry ports at one end thereof. The gas is collected at the other end of the cylinder in two annuli. The heavier components are concentrated in the outer exit annulus, and the lighter components in the inner exit annulus. It is also possible by various techniques to cause the gas to circulate twice through the rotor, passing in one direction along the periphery and in the other at a smaller radius. However, Avery, *Physics Bulletin,* 1970, pages 17 to 21 (January, 1970) points out that within current engineering limitations for such equipment the size of the individual machine is such that the separative work output is orders of magnitude less than that of a diffusion plant stage, and a centrifuge enrichment plant for practical purposes will require hundreds of thousands of machines. This means that methods must be developed for mass producing the machines and the components at low cost, and this means a major design problem. Avery points out that while a gas centrifuge may be technically feasible, it remains yet to be seen if it be practical, since cost indications are very speculative, since it has not been tested except in small-scale experiments.

It has been proposed to utilize the inertia effects arising from differences in mass in a gas centrifuge without employing moving parts. One rather obvious method is to rotate the gas in a cyclone, in which it would be expected that the heavier molecules would diffuse outward and the lighter towards the center of the cyclone. However, in order to maintain a cyclone a certain inward flow of the gas mixture is necessary, and both components move towards the center, though at a different rate.

Noller and Mutz, *Naturwissenschaften* 1958 45 (16), pages 382–383, reported some separation, but had difficulties with turbulence at high Reynolds numbers. The result is that this method has not been attractive, and it has been considered that at best, the separation obtained should be similar to that of the diffusion method, but since the power consumption is high, the advantage of the centrifuge over gas diffusion is lost. Thus, London has stated in his text *Separation of Isotopes* (London, George Newnes Limited) that as the whole process is less straightforward than the diffusion method, it is not likely to offer any advantage.

Avery, *Physics Bulletin* 1970, pages 17 to 21, points out that the gas centrifuge was tried as part of the U.S. Manhattan Project, but it was the gaseous diffusion method that was adopted as more practical, and the USAEC is indicating its preference still to be for the diffusion method, in preference to moving to a new process.

In accordance with the invention, it has been determined that gaseous mixtures of components differing in molecular or atomic weight can be separated into component fractions according to molecular or atomic weight, if the mixture be subjected to centrifugal force applied to a cone-shaped vortex having a diameter of not over 5 mm. In operation, the gas feed absolute pressure is from about 5 to about 1000 mm. of mercury and the pressure ratio is within the range from about 1.5 to about 10. The pressure ratio is defined as $P_{inlet\ mm.Hg./Pcore\ outlet\ mm.Hg.}$. Under these operating conditions, which are quite important to the separation, it is possible to isolate a higher molecular weight fraction in a peripheral portion of the vortex, and a lower molecular weight fraction in a core portion of the vortex. This method is simple and straightforward, requires no equipment with moving parts, apart from the gas propulsion equipment, and is practical for operation commercially on a large scale.

In the case where an inert gas is used in admixture with the gas mixture, the gas feed pressure can exceed 1000 mm. of mercury, and gas inlet and outlet pressures can range up to the liquefaction pressure of any gas in the mixture at the operating temperature. The pressure ratio accordingly can be less than 1.5.

If the gas components are quite different in molecular or atomic weight, it may be possible to effect a good separation in one cyclone stage. If they are rather close in molecular or atomic weight, however, it may be necessary to repeat the process in several stages, recovering the higher molecular weight or lower molecular weight fraction each time from the appropriate portion of the vortex, and then recycling to a further cyclone stage. In the case of the separation of isotopes, such as separating U 235 from U 238, it may be necessary to apply several hundred cyclone stages for a satisfactory enrichment of the core portion of the vortex.

The apparatus in accordance with the invention comprises a housing with a separator chamber therein that is circular in cross-section, has a first end and a second end, has a diameter at the first end of at most 5 mm., and a diameter at the second end of at least 0.01 mm.; and has a cone angle within the range from 0° to 90°; at least one gas inlet through the housing at the base end, arranged for tangential flow of gas from outside the housing into the chamber, to establish a vortical gas flow in the chamber from the first end towards the second end, with the gaseous components distributed towards the periphery of the vortex with increasing molecular or atomic weight, and towards the core of the vortex with decreasing molecular or atomic weight, the vortex core having a lower gas pressure than the vortex periphery; an outlet through the housing in axial alignment to the chamber at the first end of the chamber; and an outlet through the housing in axial alignment to the chamber at the second end of the chamber, one end outlet receiving peripheral vortical gas flow from the chamber, and the other end outlet receiving core vortical gas flow from the chamber, so that lower molecular or atomic weight components are concentrated in the flow withdrawn via one outlet, and higher molecular or atomic weight components are concentrated in the flow withdrawn via the other outlet. This cyclonic separator is simple and straightforward in construction, has no moving parts, and is practical for commercial gas separation on a large scale despite its small size.

The centrifugal forces in the vortex cause the heavier molecular weight or atomic weight particles to diffuse towards the periphery of the vortex, and the lighter molecular or atomic weight particles to diffuse into the central or core portion of the vortex. The core portion of the vortex is at a lower gas pressure than the peripheral portion. Since in the apparatus of the invention the peripheral portion and core portion of the vorte are drawn off at opposite ends of the separator chamber, two opposing or countercurrent flows are created within the separator chamber, a peripheral portion flow, flowing in one direction towards the peripheral portion or one end outlet, and a core portion flow flowing in the opposite direction, towards the core portion or other end outlet. This in effect appreciably extends the zone of separation.

The cyclonic separators of the invention can be formed of any suitable material that is resistant to attack or corrosion by the gas mixtures to be separated under the operating conditions. Metals can be used, such as stainless steel and aluminum, and nickel and chrominum alloys. However, unless the metal can be cast, it is difficult to shape it in the very small sizes required in the invention. Ceramic, glass and plastic materials that are strong, resistant to pressure, and capable of retaining their shape under the gas pressures to be encountered, are therefore preferred. Such materials can be shaped or molded by injection or compression molding into the shapes desired, and can be manufactured in quantity without detriment. Materials such as glass, porcelain, nylon, polyfluorohydrocarbons, such as polytetrafluoroethylene, and chlorotrifluororethylene polymers, polyesters, polycarbonates, polyolefins such as polyethylene, polypropylene, polybutylene, synthetic rubbers, phenolformaldehyde, urea-formaldehyde, and melamine-formaldehyde resins are suitable, as well as polyoxymethylene.

In the preferred embodiment of cyclonic separator, the separator chamber is conical, and a tubular baffle extends from the base end outlet into the chamber to a point beyond the gas inlet or inlets, to deflect gas flow away from the base end outlet, and enhance initiation of a gas vortex at the base end, and thence through the chamber towards the apex end outlet.

The tangential orientation of the one or more gas inlets imparts a cyclonic or vortical flow to the gas mixture being introduced. The inlets should be uniformly spaced, if there is more than one, for initiation of a uniform vortical flow. Usually, from two to six gas inlets are sufficient. Then, when the gas is introduced into the chamber at high velocity, it is constrained by the curved walls of the separator chamber into a vortex which flows helically towards the apex end or peripheral portion outlet end of the chamber.

It is important that the vortex defined within the cyclone separator chamber, but not necessarily the separation chamber (which can be cylindrical), have a diameter of not over 5 mm., and preferably 2 mm. or less, and still more preferably between 1 mm. and 0.1 mm. The lower limit on diameter is imposed only by the practicality of manufacture of small cyclones. A practical lower limit appears to be 0.1 mm.

The length of the separator chamber together with the diameter determines the volume of the separator chamber, and the volume in turn determines the residence time of the gases therein, which of course must be sufficient for the desired separation. Accordingly, the length and diameter are selected to give a chamber of the determined volume for the separation. Thus, the length should not be greater than 200 mm. nor less than 0.1 mm. and if the chamber is conical in shape, it should be at least 0.1 mm. in diameter at the apex end.

The cone angle, i.e. the angle at the apex end of the conical chamber (by extrapolation of the cone sides to their meeting point), is within the range from 0° to 90°, preferably from about 3° to about 30°. The cone of the cyclone separator chamber is of course truncated. Good results have been obtained at a ratio of the diameter at the base of the cone to the diameter at the apex of the cone $D_{base}/D_{apex\ outlet}$ of from 1.3 to 3.5 and at a ratio of the base diameter to core outlet diameter $D_{base}/D_{core\ outlet}$ of from 1.3 to 3.5.

It has been determined in accordance with the invention that it is not possible to effectively separate gas components according to their molecular or atomic weight, if the chamber has a larger diameter than 5 mm., and since cyclone chambers heretofore have been considerably larger, this is probably one of the reasons why cyclonic separators have not heretofore been employed for this purpose. If the vortex is larger in diameter than 5 mm., both components move towards the center of the vortex at too great a rate to permit effective separation, and the problems noted by London begin to be encountered. Hence, the small size overcomes the difficulties that previous workers in the field have encountered with cyclone gas separators.

The shape of the separator chamber (and vortex) is quite significant. It has been found that a high separation efficiency is obtained in conically chaped chambers. A conical chamber must decrease in diameter towards the apex end, reducing the radius of the vortex and increasing centrifugal force.

The terms "cone shaped" or "conically shaped" as used herein refer to the effective cone shape of the chamber. The effective diameter of the chamber at the apex outlet is equal to the diameter of the apex outlet, and if this diameter is less than the diameter of the inlet or base outlet, the chamber is in effect a cone. If this is the case, the vortex in the chamber will be reduced in diameter towards the apex end, even if the shape of the chamber in between the ends is not a straight-sided cone but, for example, a cylinder.

The chamber can be in the form of a straight-sided right angle cone from base end to apex end. It can also be partly or wholly cylindrical, and cone-shaped, if at all, only at the apex end. The cone shape need not be uniform or straight-sided. Convexly and concavely curved sides can be used, of uniform or increasing or decreasing curvature. The diameter can decrease continuously towards the apex end, or in stages. Thus, a cone with straight sides but varying cone angle can be used. Thus, a variety of cone shapes are possible, and the shape chosen will depend on the particular conditions of the separation to be carried out, and may be determined by trail-and-error experimentation.

It is also important to have a pressure drop between the gas inlet and the apex and core gas outlets sufficient to cause an acceleration in the velocity of the gas as it approaches the region of lesser diameter in the cone. This gives maximum centrifugal force for separation in the region of smallest radius. As pressure drops, pressure energy or pressure head is converted to velocity head, and velocity increases. Thus, the energy needed to accelerate the particles is obtained from the pressure drop, abd makes the separation possible. It is for this reason that the pressure ratio is quite critical to the operation of the apparatus of the invention.

This means also that the maximum separating effectiveness can be at a region within the vortex where the radius is small, instead of at the periphery of the vortex, and this region is where the maximum separating effect is needed, at the boundary between the core and peripheral regions, where the gas flow towards the apex and core outlets is in different directions. This means that the core region is the region where the heavier particles have the greatest chance of being thrown out, if they have managed to get that far, and this aids in ensuring that they do not remain with the core flow at the core region outlet.

Consequently, the base inlet, apex outlet and core outlet diameters are selected so that the pressure ratio $P_{inlet\,mm.\,Hg.}/P_{core\,outlet\,mm.\,Hg.}$ is within the range from about 1.5 to about 10, at the operating gas feed absolute pressure within the range from about 5 to about 1000 mm. of mercury. In effect, this means that the gas pressure at the gas inlet is at least 1.5 times up to about 10 times the pressure at the core outlet of the chamber. Preferably, for optimum separation efficiency, the pressure ratio is within the range from about 2 to about 6.

In the case where an inert gas is used, the gas inlet and outlet pressures can be much higher. The upper limit is in fact the liquefaction pressure for any gas present in the mixture at the operating temperature. A practical upper limit for gas inlet and outlet pressure is 500 atmospheres.

In consequence, the pressure ratio can be less than 1.5. A practical lower limit is 0.001. The upper limit remains at 10, in this case. The preferred pressure ratio range is from 0.1 to 6.

The gas can be admitted through the gas inlet via a nozzle, jet or orifice, which partially converts pressure heads into velocity head. This is particularly advantageous in initiating the vortex.

The inlet velocity of the gas mixture can be at least the velocity of sound, at the temperature of operation, and it can be several times this velocity, if desired, but this requires special gas inlet equipment. It is possible to use lower velocities than this, depending on the gas, and this can be determined by experimentation for each gas. The separating effect for a given pressure drop is also to some extent dependent on the inlets themselves, their shape, number, and spacing. If the inlets provide a perfectly uniform flow around the periphery, then it is possible to operate at relatively low gas inlet velocities, below the speed of sound.

The process can be operated at any convenient temperature. Small variations in temperature are not critical. The operating temperature will normally be selected as the temperature at which all of the components to be separated are in the gas phase in the separator chamber. In the case of some materials, this may require relatively high temperatures, while in the case of materials which are normally gaseous at normal room temperature, normal room temperature can be used. In some cases, very low operating temperatures may be preferable. The range of operating temperatures is thus from about $-50$ to about 500° C., and preferably from about $-20°$ to about 300° C.

As indicated previously, it has been found advantageous to blend the gas mixture to be separated with an inert gas of lower molecular or atomic weight. An increased degree of separation is obtained, and the effect is particularly marked at amounts of inert gas in excess of about 25% by volume of the blend, and especially in excess of about 60% by volume of the blend. This effect is believed to be due to an increase in the sonic velocity of the gas, because of the reduced average molecular or atomic weight of the blend, and some influence on the overall diffusion mechanism.

While any gas can be used that is inert to, i.e. does not react appreciably with, the gas mixture to be separated, it must have a molecular or atomic weight less than the gas mixture, and preferably as low as molecular or atomic weight as possible, so that hydrogen and helium are preferred. However, nitrogen, methane, ethane, carbon monoxide, carbon dioxide, and water also can be used.

In the case where an inert gas is used, the process can be operated at a gas inlet absolute pressure higher than 1000 mm. Hg. As a practical matter, gas inlet and outlet absolute pressures up to about 500 atmospheres can be used, but this limit can be exceeded if equipment permits.

After the separation has been effected, the inert gas can be separated by conventional techniques such as condensation of the heavier or less volatile separated components.

In the case where the gas mixture is to be subjected to a number of vortex stages, it is advantageous to employ an array of vortex separators or cyclones, arranged in two series, in cascade. A typical cascade series which can be used is described by Avery, *Physics Bulletin* (1970), page 18. The core portion from each cyclone stage is separated and combined in series with the apex portion from a latex cyclone stage, and this repeated at each stage to the end of the series, while in the other series, the apex portions are separated and sent through with the core portions from a later stage. Any arrangement of the cyclones and the feedback can be used. In this way, no part of the material need be wasted, and eventually all of the components separated can be recovered, if desired.

FIG. 1 shows in longitudinal section a typical conical cyclonic separator of the invention, which can be used in the process of the invention.

FIG. 2 is a view taken along the lines 2—2 of FIG. 1, and shows the cyclonic separator thereof in cross-section, with the peripheral portions and the core portions of the vortex flow being delineated.

FIG. 3 shows diagrammatically a typical array of cyclone separators, arranged in a twin cascading Series $a$ and $b$ of core portion cyclones and apex portion cyclones, respectively, showing the flow of the core portions and the apex portions through each series, to the final separation of the components of the gaseous mixture at the end of each series.

Figure 4:
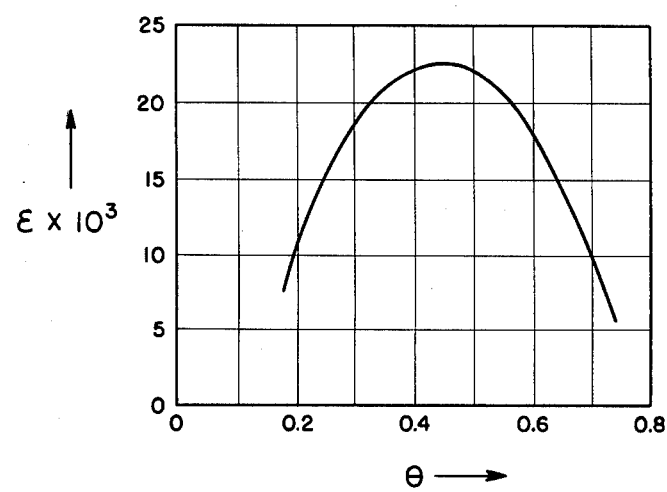
FIG. 4 is a graph of observed values of the separation factor E against the uranium distribution ratio $\theta$ of the data in Table VI.

The cyclone of FIGS. 1 and 2 has a housing 1 with six gas inlets 2 arranged tangentially at the base end 3 of the conical separation chamber 5. The gas outlet 4 for the peripheral portion of the vortex is at the apex end 9 of the conical separation chamber 5, and the gas outlet 6 for the core portion of the vortex is at the base end of the chamber. The inner end of the tube 7 projects inwardly from the base of the cone, and defines an annulus 8 into which the gas inlets 2 open. The gas inlets 2 because they are placed tangentially initiate a vortical flow of gas shown by the helical arrow, about the annulus 8 defined by the inner end of the tube 7. The vortical flow thus created proceeds along the periphery of the cone towards the outlet 4, and in the course of this travel the components of heavier molecular weight or atomic weight are thrown to the peripheral portion of the vortex, while the components of lower molecular weight or atomic weight are drawn towards the core portion of the vortex. The core portion of the vortex is drawn in the opposite direction, towards outlet 6. There is thus a countercurrent flow of the inner and outer vortices, and this promotes efficient separation, besides appreciably increasing the zone of separation.

In operation, the gas mixture entering via the inlets 2 described a vortex about the periphery of the chamber, and there is a peripheral flow of gas towards the outlet 4. At the same time, a core portion is formed at the center of the vortex, and the gas flow in this portion is in the opposite direction, towards the core portion outlet 6. The pressure in this core portion is reduced compared to the pressure at the inlet 2. In this way, the lower molecular weight portion leaves the vortex separator via the outlet 6, and the heavier molecular weight portion leaves the separator via the outlet 4.

An array of these cyclones in two cascading Series $a$ and $b$ to provide a plurality of centrifugal separation stages can take the form shown in FIG. 3. The gas mixture enters the inlet via compressor C to the first cyclonic separator I, blended in the compressor C with apex portion form cyclonic separator IIa, and core portion from cyclonic separator IIb. Series $a$ concentrates or enriches with respect to a lighter component. The core portion is drawn off at the base of I, and passed to the next separator IIa of the Series, blended with apex portion from cyclonic separator IIIa; thence as core portion to cyclonic separator IIIa, blended with apex portion from separator IVa; thence as core portion to cyclonic separator IVa, blended with apex portion from Va; thence as core portion to cyclonic separator Va, blended with apex portion from separator Vb; thence as core portion to cyclonic separator VIa.

In this way, the core portions become successively more and more concentrated in the lighter component, and finally at VIa, the end of the Series, the lighter component is withdrawn from the system.

Series $b$ concentrates with respect to a heavier component. The apex portion from I is drawn off at the apex, and passed via compressor C to cyclonic separator IIb, blended with core portion from IIIb; the apex portion drawn off and fed to the separator IIIb, after blending with core portion from IVb; the apex portion drawn off from IIIb and fed to IVb, after blending with core portion from Vb; the apex portion drawn off and fed to Vb, after blending with core portion from VIb; the apex portion from Vb drawn off and fed to VIb. Thus, the apex portions become successively concentrated in the heavier component.

The following Examples in the opinion of the inventor represent preferred embodiments of the invention.

EXAMPLE 1

The cyclones used in this test were of the type shown in FIGS. 1 and 2. These cyclones were used to separate carbon dioxide from air in mixtures of approximately constant composition, containing 8.5 volume percent $CC_2$. The gas flowed from a receptacle through a reducing valve, a filter, a control valve and a venturi flow meter, to the container with the cyclones. The two fractions from the cyclones were passed through venturi meters and control valves to a vacuum pump, and a portion drawn off through the valves to a gas analyzer for analysis. The gas pressures in the cyclone container compartments were measured with absolute mercury manometers to an accuracy of approximately 0.5 mm. of mercury.

The difference in $CO_2$ content between the two fractions from the cyclones was registered by means of an infrared analyzer and a connected potentiometric recorder.

The following data, Tables I, II and III, were obtained with the 2 mm. cyclone. This cyclone had a cone angle of 5.7° and three or six uniformly spaced inlet openings of rectangular cross section, 0.6 mm. by 0.3 mm.

TABLE I

| CYCLONIC SEPARATOR | | P inlet mm. Hg. | P core outlet mm.Hg. | P apex outlet mm.Hg. | Mole % $CO_2$ | Flow Rate l(STP/min.+) | Separation Factor | Flow Distribution Factor |
|---|---|---|---|---|---|---|---|---|
| Number of inlet openings | 3 | 90.0 | 15.0 | 13.0 | 8.35 | 0.50 | 0.0542 | 0.663 |
| | | 90.0 | 15.0 | 15.0 | 8.35 | 0.50 | 0.0539 | 0.647 |

TABLE I-continued

| CYCLONIC SEPARATOR | | P inlet mm. Hg. | P core outlet mm.Hg. | P apex outlet mm.Hg. | Mole % CO$_2$ | Flow Rate l(STP/min.+) | Separation Factor | Flow Distribution Factor |
|---|---|---|---|---|---|---|---|---|
| | | 90.0 | 15.0 | 17.0 | 8.35 | 0.50 | 0.0532 | 0.653 |
| | | 90.0 | 15.0 | 19.0 | 8.35 | 0.50 | 0.0524 | 0.653 |
| Base outlet | | 90.0 | 15.0 | 21.0 | 8.35 | 0.50 | 0.0516 | 0.644 |
| diameter (mm.) | 0.75 | 90.0 | 15.0 | 30.0 | 8.35 | 0.49 | 0.0443 | 0.596 |
| Apex outlet | | 90.0 | 18.0 | 14.0 | 8.35 | 0.50 | 0.0544 | 0.672 |
| diameter (mm.) | 1.0 | 90.0 | 18.0 | 16.0 | 8.35 | 0.50 | 0.528 | 0.665 |
| | | 90.0 | 18.0 | 18.0 | 8.35 | 0.50 | 0.0524 | 0.657 |
| | | 90.0 | 18.0 | 20.0 | 8.35 | 0.50 | 0.0511 | 0.652 |
| | | 90.0 | 18.0 | 22.0 | 8.35 | 0.48 | 0.0513 | 0.640 |
| | | 90.0 | 18.0 | 24.0 | 8.35 | 0.50 | 0.0499 | 0.645 |
| | | 90.0 | 18.0 | 26.0 | 8.35 | 0.50 | 0.0488 | 0.627 |
| | | 90.0 | 18.0 | 30.0 | 8.35 | 0.49 | 0.0443 | 0.525 |
| | | 90.0 | 22.0 | 16.0 | 8.35 | 0.50 | 0.0523 | 0.670 |
| | | 90.0 | 22.0 | 20.0 | 8.35 | 0.50 | 0.0514 | 0.666 |
| | | 90.0 | 22.0 | 22.0 | 8.35 | 0.50 | 0.0515 | 0.669 |
| | | 90.0 | 22.0 | 24.0 | 8.35 | 0.50 | 0.0514 | 0.650 |
| | | 90.0 | 22.0 | 26.0 | 8.35 | 0.50 | 0.0487 | 0.645 |
| | | 90.0 | 25.0 | 18.0 | 8.35 | 0.48 | 0.0489 | 0.724 |
| | | 90.0 | 25.0 | 20.0 | 8.35 | 0.48 | 0.0484 | 0.718 |
| | | 90.0 | 25.0 | 22.0 | 8.35 | 0.48 | 0.0499 | 0.711 |
| | | 90.0 | 25.0 | 24.0 | 8.35 | 0.48 | 0.0483 | 0.706 |
| | | 90.0 | 25.0 | 26.0 | 8.35 | 0.48 | 0.0479 | 0.683 |
| | | 90.0 | 25.0 | 28.0 | 8.35 | 0.48 | 0.0470 | 0.667 |

+)liters per min. at 0° C, 1 atm.

TABLE II

| CYCLONIC SEPARATOR | | P inlet mm. Hg. | P core outlet mm.Hg. | P apex outlet mm.Hg. | Mole % CO$_2$ | Flow Rate l(STP)/min.+) | Separation Factor | Flow Distribution Factor |
|---|---|---|---|---|---|---|---|---|
| Number of inlet | | 90.0 | 15.0 | 14.0 | 8.35 | 0.46 | 0.0435 | 0.657 |
| openings | 6 | 90.0 | 15.0 | 16.0 | 8.35 | 0.46 | 0.0435 | 0.657 |
| | | 90.0 | 15.0 | 20.0 | 8.35 | 0.46 | 0.0436 | 0.691 |
| Base outlet | | | | | | | | |
| diameter (mm.) | 0.75 | 90.0 | 18.0 | 16.0 | 8.35 | 0.46 | 0.0440 | 0.665 |
| | | 90.0 | 18.0 | 18.0 | 8.35 | 0.46 | 0.0430 | 0.671 |
| Apex outlet | 1.0 | | | | | | | |
| diameter(mm.) | | | | | | | | |

+)liters per min. at 0° C, 1 atm.

TABLE III

| CYCLONIC SEPARATOR | | P inlet mm. Hg. | P core outlet mm. Hg. | P apex outlet mm. Hg. | Mole % CO$_2$ | Flow Rate l(STP)/min.) | Separation Factor | Flow Distribution Factor |
|---|---|---|---|---|---|---|---|---|
| Number of inlet | | 90.0 | 15.0 | 13.0 | 8.67 | 0.51 | 0.0572 | 0.520 |
| openings | 3 | 90.0 | 15.0 | 15.0 | 8.67 | 0.51 | 0.0567 | 0.513 |
| | | 90.0 | 15.0 | 17.0 | 8.67 | 0.50 | 0.0565 | 0.514 |
| Basic outlet | | 90.0 | 15.0 | 19.0 | 8.67 | 0.50 | 0.0554 | 0.498 |
| diameter (mm.) | 1.0 | 90.0 | 15.0 | 21.0 | 8.67 | 0.50 | 0.541 | 0.487 |
| Apex outlet | | 90.0 | 18.0 | 16.0 | 8.67 | 0.50 | 0.0552 | 0.5235 |
| | | | 18.0 | 18.0 | 8.67 | 0.50 | 0.0548 | 0.520 |
| diameter (mm.) | 1.0 | 90.0 | 18.0 | 20.0 | 8.67 | 0.50 | 0.0530 | 0.511 |
| | | 90.0 | 18.0 | 22.0 | 8.67 | 0.50 | 0.0519 | 0.491 |
| | | 90.0 | 18.0 | 24.0 | 8.67 | 0.50 | 0.0515 | 0.471 |
| | | 90.0 | 22.0 | 20.0 | 8.67 | 0.50 | 0.0504 | 0.566 |
| | | 90.0 | 22.0 | 22.0 | 8.67 | 0.50 | 0.0503 | 0.554 |
| | | 90.0 | 22.0 | 24.0 | 8.67 | 0.50 | 0.511 | 0.525 |
| | | 90.0 | 22.0 | 26.0 | 8.67 | 0.49 | 0.0486 | 0.481 |
| | | 90.0 | 25.0 | 23.0 | 8.67 | 0.49 | 0.0457 | 0.598 |
| | | 90.0 | 25.0 | 25.0 | 8.67 | 0.49 | 0.0460 | 0.573 |
| | | 90.0 | 25.0 | 27.0 | 8.67 | 0.49 | 0.0455 | 0.542 |
| | | 90.0 | 25.0 | 29.0 | 8.67 | 0.48 | 0.0438 | 0.489 |

+)liters per min. at 0° C., 1 atm.

The separation factor E is defined by the equation $E = x_{apex} - x_{core}/x_{core}(1 - x_{apex})$ where $x$ is the mole fraction, in this case, of carbon dioxide, in the gas. The greater the separation factor, the more effective the separation. The flow distribution factor is defined as the molar flow fraction of the incoming gas leaving through the apex outlet. It is apparent from the data that good separation is obtained.

The cyclones of the invention are useful in the separation of gas mixtures into their components according to molecular weight or atomic weight. It is possible in this way to separate in vapor form isotopes of various elements in the form of gaseous compounds, which after separation can be treated to recover the element in any desired form, including the elemental metal. It is possible, for example, to separate U 235 from U 238 in the mixtures thereof as uranium hexafluoride.

EXAMPLE 2

The isotope U 235 is separated from U 238 in uranium hexafluoride gas, in accordance with the following procedure.

The apparatus used is composed of 813 stages in an array whose through flow is in accordance with the diagram shown in FIG. 3. Each separator chamber has a 2 mm. maximum diameter at the inlet port, and a 1 mm. diameter at the core outlet and at the apex port. The separator chambers are conical, as shown in FIGS. 1 and 2, with a length of 10 mm. The inlet pressure is 90 mm. Hg.; the core and apex gas outlet pressures are 15 mm. Hg. The pressure ratio is 6. The gas entrance velocity in the separation chamber is the velocity of sound.

The gas mixture introduced in the first cyclone separator stage contains 99.3% U 238 and 0.7% U 235. In each of the Series a cyclone stages, the core fraction is enriched in U 235. The gas emerging from the last cyclone stage (counted from the feed stage) of the core portion Series b is enriched in U 235 to 3%, and the gas obtained from the apex portion Series a of cyclones contains nearly all U 238 and a very small amount, 0.2%, of U 235.

EXAMPLE 3

The cyclones used in this test were of the type shown in FIGS. 1 and 2. The cyclones were used to separate carbon monoxide from carbon dioxide in a mixture containing about 25% CO, and about 75% $CO_2$, and blended with the amounts of helium shown in Tables IV and V. The gas blend flowed through a system as in Example 1, and the composition of the two fractions from the cyclones measured by infrared analyzers in the same way.

The data obtained using a 2 mm. cyclone is given in Table IV. The data obtained using a 1 mm. cyclone is given in Table V. The cone angle of the cyclone in both cases was 5.7°.

EXAMPLE 4

The isotope U 235 is separated from U 238 in uranium hexafluoride gas blended with helium gas, in accordance with the following procedure.

The apparatus used is composed of 200 stages in an array whose through flow is in accordance with the diagram in FIG. 3. Each separator chamber has a 2 mm. maximum cone diameter and a 1 mm. diameter at the core outlet and at the apex outlet. The separator chambers are conical, as shown in FIGS. 1 and 2, with a length of 10 mm. The inlet pressure is 300 mm. Hg. The core and apex gas outlet pressures are 60 mm. Hg. The pressure ratio is 5. The gas entrance velocity in the separation chamber is the velocity of sound.

The uranium hexafluoride introduced into the first cyclone separation stage contains 99.3% U 238 and 235. The feed to each cyclone separator stage is regulated to contain 90% helium, the same in each, by blending appropriate selected fractions from subsequent Series a stages as shown in FIG. 3. In each of the Series a cyclone stages, the core fraction is enriched in U 235, the gas emerging from the last stage of the core portion Series a enriched in U 235 to 3%, and the gas obtained for the apex portion Series b of cyclones contains nearly all U 238 and a very small amount, 0.2%, of U 235.

EXAMPLE 5

TABLE IV

| CYCLONIC SEPARATOR | P inlet mm. Hg. | P core outlet mm. Hg. | P apex outlet mm. Hg. | Mole % He | Flow Rate l(STP)/min.+) | Separation Factor | Flow Distribution Factor |
| --- | --- | --- | --- | --- | --- | --- | --- |
| No. of inlet openings 3 | 180 | 36 | 36 | 0 | 0.50 | 0.044 | 0.63 |
| Base diameter 2 mm. | 180 | 36 | 36 | 62.8 | 0.75 | 0.067 | 0.38 |
| Base outlet diameter 1 mm. | 180 | 36 | 36 | 69.5 | 0.81 | 0.082 | 0.38 |
| Apex outlet diameter 1 mm. | 180 | 36 | 36 | 76.1 | 0.92 | 0.106 | 0.41 |
| | 180 | 36 | 36 | 77.3 | 0.98 | 0.112 | 0.42 |
| | 180 | 36 | 36 | 78.9 | 1.09 | 0.114 | 0.43 |
| | 10 | 36 | 36 | 85.0 | 1.22 | 0.126 | 0.45 |
| | 180 | 36 | 36 | 88.3 | 1.33 | 0.146 | 0.45 |
| | 180 | 36 | 36 | 92.9 | 1.50 | 0.147 | 0.46 |

+)liters per min. at 0° C, 1 atm.

TABLE V

| CYCLONIC SEPARATOR | P inlet mm. Hg. | P core outlet mm. Hg. | P apex outlet mm. Hg. | Mole % He | Flow Rate l(STP)/min.+) | Separation Factor | Flow Distribution Factor |
| --- | --- | --- | --- | --- | --- | --- | --- |
| No. of inlet openings 3 | 180 | 36 | 36 | 47.7 | 0.29 | 0.071 | 0.43 |
| Base diameter 1 mm. | 180 | 36 | 36 | 62.4 | 0.32 | 0.096 | 0.44 |
| Base outlet diameter 0.6 mm. | 180 | 36 | 36 | 85.0 | 0.42 | 0.123 | 0.46 |
| Apex outlet diameter 1 mm. | 180 | 36 | 36 | 88.3 | 0.45 | 0.128 | 0.47 |
| | 180 | 36 | 36 | 92.9 | 0.50 | 0.137 | 0.48 |
| | 300 | 60 | 60 | 47.7 | 0.51 | 0.063 | 0.41 |
| | 300 | 60 | 60 | 62.4 | 0.58 | 0.073 | 0.42 |
| | 300 | 60 | 60 | 77.3 | 0.67 | 0.115 | 0.43 |
| | 300 | 60 | 60 | 85.0 | 0.76 | 0.130 | 0.44 |
| | 300 | 60 | 60 | 88.3 | 0.81 | 0.144 | 0.44 |

+)liters per min. at 0° C, 1 atm.

The separation factor E is defined by the equation $E = x_{apex} - x_{core}/x_{core}(1 - x_{apex})$
where x is the mole fraction of carbon dioxide in the mixture carbon monoxide carbon dioxide (excluding the helium). The flow distribution factor is defined as the molar flow fraction of the incoming gas leaving through the apex outlet. It is apparent from the data that good separation is obtained, and that the separation factor increases as the amount of helium increases.

Samples of purified uranium hexafluoride ($UF_6$) and helium (92% He, 8% $UF_6$ by volume) were prepared as follows. The vessel containing the purified $UF_6$ was connected to an evacuated sample container. The vessel was kept at 18° C in a constant temperature bath, and the containers cooled by liquid nitrogen. The amount of $UF_6$ thus transferred to the container was determined by weighing. The difference between the $UF_6$-contents of sample pairs was kept at less than 2%. The $UF_6$ in the containers was then dissolved in 3 g carbon tetrachloride (tetrachloromethane, $CCl_4$) which was likewise transferred to the container by distillation, to give a homogeneous sample.

The sample containers were made of aluminum, which has a relatively low absorption of gamma-rays. The wall thickness was 1.75±0.01 mm.

As well-type sodium iodide (NaI)-detector coupled to a multichannel analyzer was used to measure the gamma-ray emission from the samples for the range from 50 to 210 keV, at 3keV, at 3keV per channel. The number of counts belonging to the characteristic peak at 185 keV, corrected for the influence of Thorium 634 (Th-234) peaked at 94 keV, was taken as a measure of the U-235 content of the sample. The background radiation proved to be of negligible importance. The containers fitted very closely into the detector well.

The apparatus used was composed of four cyclone separators, in parallel, constituting one stage of a cascade in accordance with the diagram in FIG. 3. Each of cyclone separator chamber had a 2 mm. maximum cone diameter, and a 1 mm. diameter at the core outlet and at the apex outlet. The separator chambers were conical, as shown in FIGS. 1 and 2, with a length of 10 mm.

The inlet pressure used was 180 mm. Hg. The pressure in the enriched stream (base outlet) from the cyclones was fixed at 36 mm. Hg. while the pressure in the depleted stream (apex outlet) was varied between 36 and 65 mm. Hg.

Several runs were made under these conditions, and the separation efficiency determined by way of the separation factor.

The following results were obtained:

TABLE VI

| RUN NO. | SEPARATION FACTOR ($E \times 10^3$) | URANIUM DISTRIBUTION RATIO ($\theta$) |
| --- | --- | --- |
| 1 | 10 | 0.20 |
| 2 | 20 | 0.33 |
| 3 | 23 | 0.50 |
| 4 | 13 | 0.67 |

The observed separation factor is plotted against the uranium distribution ratio $\theta$ for four of the runs in the graph shown in FIG. 4.

The uranium distribution ratio $\theta$ is defined as:

$$\theta = \frac{\text{Molar flow rate uranium through apex outlet}}{\text{Total molar flow rate uranium through apex and base outlets}}$$

As the curve shows, the separation factor reaches a maximum value of about $23 \times 10^3$ at a value of $\theta$ of about 0.5.

This is quite significant to power consumption; it means that an equivolume distribution of effluent flow at the apex and base outlets of the cyclones can be used in the simplest form of cascade, of the type shown in FIG. 3, and will give minimum power consumption. Consequently, in the operation of the cascade equal flow volumes can be maintained in the return and forward flows from the apex and base ends of cyclone I, and thence through every cyclone in the $a$ and $b$ series II to VI, etc., which is a very convenient way to operate, and in this way when operating at maximum separation efficiency the power consumption will be at a minimum. Also the whole installation is simple and less expensive.

Accordingly, in the light of the above results, the isotope U 235 is separated from U 238 in uranium hexafluoride gas blended with helium gas, in accordance with the following procedure.

The apparatus used is composed of 200 stages in an array whose through flow is in accordance with the diagram in FIG. 3. Each separator chamber has a 2 mm. maximum cone diameter and a 1 mm. diameter at the core outlet and at the apex outlet. The separator chambers are conical, as shown in FIGS. 1 and 2, with a length of 10 mm. The inlet pressure is 180 mm. Hg. The core and apex gas outlet pressures are 36 mm. Hg. The pressure ratio is 5. The gas entrance velocity in the separation chamber is the velocity of sound. Equal flow volumes are maintained in the effluent gas at the apex outlet and base outlet of each cyclone in each series.

The uranium hexafluoride introduced into the first cyclone separation stage contains 99.3% U 238 and 0.7% U 235. The feed to the first cyclone separator stage contains 92% helium, and 8% $UF_6$ by volume, and proceeds to subsequent stages in the series by blending equal volumes of feed and fraction selected from a subsequent Series a stage as shown in FIG. 3. Each stage is operated at a uranium distribution ratio $\theta$ of about 0.5. In each of the Series $a$ cyclone stages, the core fraction in enriched in U 235, the gas emerging from the last stage of the core portion Series $a$ being enriched in U 235 to 3%, and the gas obtained from the final stages apex portion of the Series $b$ of cyclones containing nearly all U 238, and a very small amount, 0.2% of U 235.

The cyclones of the invention are also useful as the molecule separator stage in gas chromatography-mass spectrometry systems. Such systems combine two physiochemical methods, using the molecule separator of the invention as the key function. Gas chromatography is a most efficient technique for separating components of organic compounds with sufficient volatility and thermostability, while mass spectrometry is a unique method for identifying those components. The direct introduction of separated gaseous components from the gas chromatography column via the cyclones of the invention to the mass spectrometer reduces dead volume to a minimum, achieves a fast flow rate, and provides high sample-to carrier gas enrichment. The gas chromatography and mass spectrometers employed can be conventional. A suitable system, for instance, is the LKB gas chromatography-mass spectrometry system, which includes a single-focusing mass spectrometer equipped with a 60° sector, 20 cm. radius magnetic analyer, and sweep generator for fast scanning of spectra, a rhenium filament to provide an ion source of the electron bombardment type, and a measuring system including a 14-stage electron multiplier, electrometer, and a wide band amplifier feeding a direct-writing UV oscillograph. A helium carrier gas is used, and the sample is injected through the gas chromatographic column with helium.

Having regard to the foregoing disclosure, the following is claimed as the inventive and patentable embodiments thereof:

1. A vortex separator for separating gaseous mixtures into component fractions according to their molecular or atomic weight, comprising a housing having a separator chamber therein that is cone-shaped at least in part, and in the cone-shaped portion is circular in cross-section, has an apex end and a base end, has an end wall at the base end, and side walls extending therefrom to the apex end; has a diameter at the base end of at most 5 mm, and a diameter at the apex end of at least 0.01 mm; has a length of at least 0.1 mm and not greater than 200 mm, and has a cone angle within the range from 1° to 90°; at least one gas inlet through the housing at the base end of the chamber, arranged for tangential flow of gas from outside the housing into the chamber, to establish a vortical gas flow in the chamber from the base end towards the apex end, with the gaseous components distributed towards the periphery of the vortex with increasing molecular or atomic weight, and towards the core of the vortex with decreasing molecular or atomic weight; an outlet through the housing in axial alignment to the chamber at the base end of the chamber; and an outlet at the apex end of the chamber; the apex end outlet receiving peripheral vortical gas flow from the chamber and the base end outlet receiving core vortical gas flow from the chamber; the ratio of the diameter of the separator chamber at the base of the cone to the diameter of the separator chamber at the apex outlet $D_{base}/D_{apex\,outlet}$ being within the range from about 1.3 to about 3.5, and the ratio of the diameter of the separator chamber at the base of the cone to the diameter of the separator chamber at the core outlet $D_{base}/D_{core\,outlet}$ being within the range from about 1.3 to about 3.5.

2. A vortex separator according to claim 1, wherein a tubular baffle extends from the base outlet into the chamber to a point beyond the inlet, to deflect gas inlet flow away from the base outlet.

3. A vortex separator according to claim 1, in which the chamber is at most 200 mm. long.

4. A vortex separator according to claim 1, in which the sides of the chamber define a straight- and smooth-sided conical space.

5. A vortex separator according to claim 1, in which the gas inlets are at least two in number, and uniformly spaced.

6. A vortex separator according to claim 1, in which the gas inlets are constructed to give a supersonic inlet flow velocity.

7. A vortex separator according to claim 1, in which the chamber is conical at least in a major portion.

8. A vortex separator according to claim 1, in which the maximum chamber diameter is less than 2 mm.

9. A vortex separator according to claim 1, in which the cone angle of the apex end of the conical portion of the chamber is within the range from 1° to 90°.

10. A vortex separator for separating gaseous mixtures into component fractions according to their molecular or atomic weight, comprising a housing having a separator chamber therein that is circular in cross-section, has a first end and a second end; has an end wall at the first end and side walls extending therefrom to the second end; has a diameter at the first end of at most 5 mm and a diameter at the second end of at least 0.01 mm; has a length of at least 0.1 mm and not greater than 200 mm, and has a cone angle within the range from 1° to 90°; at least one gas inlet through the housing at the first end of the chamber, arranged for tangential flow of gas from outside the housing into the chamber, to establish a vortical gas flow in the chamber from the first end towards the secnd end, with the gaseous components distributed towards the periphery of the vortex with increasing molecular or atomic weight, and towards the core of the vortex with decreasing molecular or atomic weight; an outlet through the housing in axial alignment to the chamber at the first end of the chamber; and an outlet at the second end of the chamber, one of the end outlets receiving peripheral vortical gas flow from the chamber and the other end outlet receiving core vortical gas flow from the chamber; the ratio of the diameter of the separator chamber at the base of the cone to the diameter of the separator chamber at the first end outlet $D_{base}/D_{first\,end\,outlet}$ being within the range from about 1.3 to about 3.5, and the ratio of the diameter of the separator chamber at the base of the cone to the diameter of the separator chamber at the core outlet $D_{base}/D_{core\,outlet}$ being within the range from about 1.3 to about 3.5.

11. A vortex separator according to claim 10, wherein a tubular baffle extends from the base outlet into the chamber to a point beyond the inlet, to deflect gas inlet flow away from the base outlet.

12. A vortex separator according to claim 10, in which the chamber is at most 200 mm. long.

13. A vortex separator according to claim 10, in which the sies of the chamber define a straight-and smooth-sided conical space.

14. A vortex separator according to claim 10, in which the gas inlets are at least two in number, and uniformly spaced.

15. A vortex separator according to claim 10, in which the gas inlets are constricted to give a supersonic inlet flow velocity.

16. A vortex separator according to claim 10, in which the chamber is conical in a major portion.

17. A vortex separator according to claim 10, in which the cone angle is within the range from about 1° to about 90°.

18. A vortex separator according to claim 10, in which the cone angle is within the range from about 3° to about 30°.

* * * * *

UNITED STATES PATENT OFFICE
CERTIFICATE OF CORRECTION

Patent No. 4,070,171          Dated January 24, 1978

Inventor(s) Nils Anders Lennart Wikdahl

It is certified that error appears in the above-identified patent and that said Letters Patent are hereby corrected as shown below:

Face Page [76] : "Bravallavaglen" should be --Bravallavagen--

Face Page [56] : after "References Cited" insert --UNITED STATES PATENTS-- after "UNITED STATES PATENTS" insert

--2,765,918   10/56   Fontein et al   55/459R
3,160,490   12/64   Fabre et al   55/459R
3,415,374   12/68   Wikdahl   55/459R
3,747,306   7/73   Wikdahl   55/17
3,892,070   7/75   Bose   55/459R -- after "FOREIGN PATENT DOCUMENTS" please insert -- 1,245,329   7/67   Germany --

Column 2, line 51 : "Pcore" should be -- $P_{core}$ --.

Column 3, line 47 : "vorte" should be --vortex--.

Column 5, line 3 : "chaped" should be --shaped--.

Column 5, line 40 : "abd" should be --and--.

Column 6, line 9 : "heads" should be --head--.

Column 7, line 4 : "latex" should be --later--.

Column 7, line 53 : "described" should be --describes--.

Column 8, line 44 : "CC$_2$" should be --$CO_2$--.

UNITED STATES PATENT OFFICE
CERTIFICATE OF CORRECTION

Patent No. 4,070,171     Dated January 24, 1978

Inventor(s) Nils Anders Lennart Wikdahl

It is certified that error appears in the above-identified patent and that said Letters Patent are hereby corrected as shown below:

Table I, last two columns :

TABLE I-continued

| CYCLONIC SEPARATOR | | P inlet mm. Hg. | P core outlet mm.Hg. | P apex outlet mm.Hg. | Mole % $CO_2$ | Flow Rate l(STP/min.+) | Separation Factor | Flow Distribution Factor |
|---|---|---|---|---|---|---|---|---|
| | | 90.0 | 15.0 | 17.0 | 8.35 | 0.50 | 0.0532 | 0.653 |
| | | 90.0 | 15.0 | 19.0 | 8.35 | 0.50 | 0.0524 | 0.653 |
| Base outlet | | 90.0 | 15.0 | 21.0 | 8.35 | 0.50 | 0.0516 | 0.644 |
| diameter (mm.) | 0.75 | 90.0 | 15.0 | 30.0 | 8.35 | 0.49 | 0.0443 | 0.596 |
| Apex outlet | | 90.0 | 18.0 | 14.0 | 8.35 | 0.50 | 0.0544 | 0.672 |
| diameter (mm.) | 1.0 | 90.0 | 18.0 | 16.0 | 8.35 | 0.50 | 0.528 | 0.665 |
| | | 90.0 | 18.0 | 18.0 | 8.35 | 0.50 | 0.0524 | 0.657 |
| | | 90.0 | 18.0 | 20.0 | 8.35 | 0.50 | 0.0511 | 0.652 |
| | | 90.0 | 18.0 | 22.0 | 8.35 | 0.48 | 0.0513 | 0.640 |
| | | 90.0 | 18.0 | 24.0 | 8.35 | 0.50 | 0.0499 | 0.645 |
| | | 90.0 | 18.0 | 26.0 | 8.35 | 0.50 | 0.0488 | 0.627 |
| | | 90.0 | 18.0 | 30.0 | 8.35 | 0.49 | 0.0443 | 0.525 |
| | | 90.0 | 22.0 | 16.0 | 8.35 | 0.50 | 0.0523 | 0.670 |
| | | 90.0 | 22.0 | 20.0 | 8.35 | 0.50 | 0.0514 | 0.666 |
| | | 90.0 | 22.0 | 22.0 | 8.35 | 0.50 | 0.0515 | 0.669 |
| | | 90.0 | 22.0 | 24.0 | 8.35 | 0.50 | 0.0514 | 0.650 |
| | | 90.0 | 22.0 | 26.0 | 8.35 | 0.50 | 0.0487 | 0.645 |
| | | 90.0 | 25.0 | 18.0 | 8.35 | 0.48 | 0.0489 | 0.724 |
| | | 90.0 | 25.0 | 20.0 | 8.35 | 0.48 | 0.0484 | 0.718 |
| | | 90.0 | 25.0 | 22.0 | 8.35 | 0.48 | 0.0499 | 0.711 |
| | | 90.0 | 25.0 | 24.0 | 8.35 | 0.48 | 0.0483 | 0.706 |
| | | 90.0 | 25.0 | 26.0 | 8.35 | 0.48 | 0.0479 | 0.683 |
| | | 90.0 | 25.0 | 28.0 | 8.35 | 0.48 | 0.0470 | 0.667 |

+liters per min. at 0° C, 1 atm.

should be

UNITED STATES PATENT OFFICE
CERTIFICATE OF CORRECTION

Patent No. 4,070,171                              Dated January 24, 1978

Inventor(s)   Nils Anders Lennart Wikdahl

It is certified that error appears in the above-identified patent and that said Letters Patent are hereby corrected as shown below:

TABLE I-continued

| CYCLONIC SEPARATOR | | P inlet mm. Hg. | P core outlet mm.Hg. | P apex outlet mm.Hg. | Mole % $CO_2$ | Flow Rate l(STP/min.+) | Separation Factor | Flow Distribution Factor |
|---|---|---|---|---|---|---|---|---|
| | | 90.0 | 15.0 | 17.0 | 8.35 | 0.50 | 0.0532 | 0.653 |
| | | 90.0 | 15.0 | 19.0 | 8.35 | 0.50 | 0.0524 | 0.653 |
| Base outlet | | 90.0 | 15.0 | 21.0 | 8.35 | 0.50 | 0.0516 | 0.644 |
| diameter (mm.) | 0.75 | 90.0 | 15.0 | 30.0 | 8.35 | 0.49 | 0.0443 | 0.596 |
| Apex outlet | | 90.0 | 18.0 | 14.0 | 8.35 | 0.50 | 0.0544 | 0.672 |
| diameter (mm.) | 1.0 | 90.0 | 18.0 | 16.0 | 8.35 | 0.50 | 0.0528 | 0.665 |
| | | 90.0 | 18.0 | 18.0 | 8.35 | 0.50 | 0.0524 | 0.657 |
| | | 90.0 | 18.0 | 20.0 | 8.35 | 0.50 | 0.0511 | 0.652 |
| | | 90.0 | 18.0 | 22.0 | 8.35 | 0.48 | 0.0513 | 0.640 |
| | | 90.0 | 18.0 | 24.0 | 8.35 | 0.50 | 0.0499 | 0.645 |
| | | 90.0 | 18.0 | 26.0 | 8.35 | 0.50 | 0.0488 | 0.627 |
| | | 90.0 | 18.0 | 30.0 | 8.35 | 0.49 | 0.0443 | 0.525 |
| | | 90.0 | 22.0 | 16.0 | 8.35 | 0.50 | 0.0523 | 0.670 |
| | | 90.0 | 22.0 | 20.0 | 8.35 | 0.50 | 0.0514 | 0.666 |
| | | 90.0 | 22.0 | 22.0 | 8.35 | 0.50 | 0.0515 | 0.669 |
| | | 90.0 | 22.0 | 24.0 | 8.35 | 0.50 | 0.0514 | 0.650 |
| | | 90.0 | 22.0 | 26.0 | 8.35 | 0.50 | 0.0487 | 0.645 |
| | | 90.0 | 25.0 | 18.0 | 8.35 | 0.48 | 0.0489 | 0.724 |
| | | 90.0 | 25.0 | 20.0 | 8.35 | 0.48 | 0.0484 | 0.718 |
| | | 90.0 | 25.0 | 22.0 | 8.35 | 0.48 | 0.0499 | 0.711 |
| | | 90.0 | 25.0 | 24.0 | 8.35 | 0.48 | 0.0483 | 0.706 |
| | | 90.0 | 25.0 | 26.0 | 8.35 | 0.48 | 0.0479 | 0.683 |
| | | 90.0 | 25.0 | 28.0 | 8.35 | 0.48 | 0.0470 | 0.667 |

+liters per min. at 0° C, 1 atm.

UNITED STATES PATENT OFFICE
CERTIFICATE OF CORRECTION

Patent No. 4,070,171  Dated January 24, 1978

Inventor(s) Nils Anders Lennart Wikdahl

It is certified that error appears in the above-identified patent and that said Letters Patent are hereby corrected as shown below:

Table III :

TABLE III

| CYCLONIC SEPARATOR | | P inlet mm. Hg. | P core outlet mm. Hg. | P apex outlet mm. Hg. | Mole % $CO_2$ | Flow Rate l(STP)/min. | Separation Factor | Flow Distribution Factor |
|---|---|---|---|---|---|---|---|---|
| Number of inlet openings | 3 | 90.0 | 15.0 | 13.0 | 8.67 | 0.51 | 0.0572 | 0.520 |
|  |  | 90.0 | 15.0 | 15.0 | 8.67 | 0.51 | 0.0567 | 0.513 |
|  |  | 90.0 | 15.0 | 17.0 | 8.67 | 0.50 | 0.0565 | 0.514 |
| Basic outlet diameter (mm.) | 1.0 | 90.0 | 15.0 | 19.0 | 8.67 | 0.50 | 0.0554 | 0.498 |
|  |  | 90.0 | 15.0 | 21.0 | 8.67 | 0.50 | 0.541 | 0.487 |
| Apex outlet |  | 90.0 | 18.0 | 16.0 | 8.67 | 0.50 | 0.0552 | 0.5235 |
|  |  | 18.0 | 18.0 | 8.67 | 0.50 | 0.0548 | 0.520 |  |
| diameter (mm.) | 1.0 | 90.0 | 18.0 | 20.0 | 8.67 | 0.50 | 0.0530 | 0.511 |
|  |  | 90.0 | 18.0 | 22.0 | 8.67 | 0.50 | 0.0519 | 0.491 |
|  |  | 90.0 | 18.0 | 24.0 | 8.67 | 0.50 | 0.0515 | 0.471 |
|  |  | 90.0 | 22.0 | 20.0 | 8.67 | 0.50 | 0.0504 | 0.566 |
|  |  | 90.0 | 22.0 | 22.0 | 8.67 | 0.50 | 0.0503 | 0.554 |
|  |  | 90.0 | 22.0 | 24.0 | 8.67 | 0.50 | 0.511 | 0.525 |
|  |  | 90.0 | 22.0 | 26.0 | 8.67 | 0.49 | 0.0486 | 0.481 |
|  |  | 90.0 | 25.0 | 23.0 | 8.67 | 0.49 | 0.0457 | 0.598 |
|  |  | 90.0 | 25.0 | 25.0 | 8.67 | 0.49 | 0.0460 | 0.573 |
|  |  | 90.0 | 25.0 | 27.0 | 8.67 | 0.49 | 0.0455 | 0.542 |
|  |  | 90.0 | 25.0 | 29.0 | 8.67 | 0.48 | 0.0438 | 0.489 |

+)liters per min. at 0° C., 1 atm.

should be

TABLE III

| CYCLONIC SEPARATOR | | P inlet mm. Hg. | P core outlet mm. Hg. | P apex outlet mm. Hg. | Mole % $CO_2$ | Flow Rate l(STP)/min.+) | Separation Factor | Flow Distribution Factor |
|---|---|---|---|---|---|---|---|---|
| Number of inlet openings | 3 | 90.0 | 15.0 | 13.0 | 8.67 | 0.51 | 0.0572 | 0.520 |
|  |  | 90.0 | 15.0 | 15.0 | 8.67 | 0.51 | 0.0567 | 0.513 |
|  |  | 90.0 | 15.0 | 17.0 | 8.67 | 0.50 | 0.0565 | 0.514 |
| Base outlet diameter (mm.) | 1.0 | 90.0 | 15.0 | 19.0 | 8.67 | 0.50 | 0.0554 | 0.498 |
|  |  | 90.0 | 15.0 | 21.0 | 8.67 | 0.50 | 0.541! | 0.487 |
|  |  | 90.0 | 18.0 | 16.0 | 8.67 | 0.50 | 0.0552 | 0.535 |
| Apex outlet |  | 90.0 | 18.0 | 18.0 | 8.67 | 0.50 | 0.0548 | 0.526 |
| diameter (mm.) | 1.0 | 90.0 | 18.0 | 20.0 | 8.67 | 0.50 | 0.0530 | 0.511 |
|  |  | 90.0 | 18.0 | 22.0 | 8.67 | 0.50 | 0.0519 | 0.491 |
|  |  | 90.0 | 18.0 | 24.0 | 8.67 | 0.50 | 0.0515 | 0.471 |
|  |  | 90.0 | 22.0 | 20.0 | 8.67 | 0.50 | 0.0504 | 0.566 |
|  |  | 90.0 | 22.0 | 22.0 | 8.67 | 0.50 | 0.0503 | 0.554 |
|  |  | 90.0 | 22.0 | 24.0 | 8.67 | 0.50 | 0.511 | 0.525 |
|  |  | 90.0 | 22.0 | 26.0 | 8.67 | 0.49 | 0.0486 | 0.481 |
|  |  | 90.0 | 25.0 | 23.0 | 8.67 | 0.49 | 0.0457 | 0.598 |
|  |  | 90.0 | 25.0 | 25.0 | 8.67 | 0.49 | 0.0460 | 0.573 |
|  |  | 90.0 | 25.0 | 27.0 | 8.67 | 0.49 | 0.0455 | 0.542 |
|  |  | 90.0 | 25.0 | 29.0 | 8.67 | 0.48 | 0.0438 | 0.489 |

+)liters per min. at 0° C., 1 atm.

UNITED STATES PATENT OFFICE
CERTIFICATE OF CORRECTION

Patent No. 4,070,171      Dated January 24, 1978

Inventor(s) Nils Anders Lennart Wikdahl

It is certified that error appears in the above-identified patent and that said Letters Patent are hereby corrected as shown below:

Column 9, line 55 :    $= x_{apex} - x_{core}/x_{core}(1 - x_{apex})$ should be $$E = \frac{x_{apex} - x_{core}}{x_{core}(1 - x_{apex})}$$

Column 11, line 61 :    $= x_{apex} - x_{core}/x_{core}(1 - x_{apex})$ should be $$E = \frac{x_{apex} - x_{core}}{x_{core}(1 - x_{apex})}$$

UNITED STATES PATENT OFFICE
CERTIFICATE OF CORRECTION

Patent No. 4,070,171    Dated January 24, 1978

Inventor(s) Nils Anders Lennart Wikdahl

It is certified that error appears in the above-identified patent and that said Letters Patent are hereby corrected as shown below:

Table IV, second column, :
line 39

TABLE IV

| CYCLONIC SEPARATOR | P inlet mm. Hg. | P core outlet mm. Hg. | P apex outlet mm. Hg. | Mole % He | Flow Rate l(STP)/min.+) | Separation Factor | Flow Distribution Factor |
|---|---|---|---|---|---|---|---|
| No. of inlet openings 3 | 180 | 36 | 36 | 0 | 0.50 | 0.044 | 0.63 |
| Base diameter 2 mm. | 180 | 36 | 36 | 62.8 | 0.75 | 0.067 | 0.38 |
| Base outlet diameter 1 mm. | 180 | 36 | 36 | 69.5 | 0.81 | 0.082 | 0.38 |
| Apex outlet diameter 1 mm. | 180 | 36 | 36 | 76.1 | 0.92 | 0.106 | 0.41 |
| | 180 | 36 | 36 | 77.3 | 0.98 | 0.112 | 0.42 |
| | 180 | 36 | 36 | 78.9 | 1.09 | 0.114 | 0.43 |
| | 10 | 36 | 36 | 85.0 | 1.22 | 0.126 | 0.45 |
| | 180 | 36 | 36 | 88.3 | 1.33 | 0.146 | 0.45 |
| | 180 | 36 | 36 | 92.9 | 1.50 | 0.147 | 0.46 |

+)liters per min. at 0° C, 1 atm.

should be

TABLE IV

| CYCLONIC SEPARATOR | P inlet mm. Hg. | P core outlet mm. Hg. | P apex outlet mm. Hg. | Mole % He | Flow Rate l(STP)/min.+) | Separation Factor | Flow Distribution Factor |
|---|---|---|---|---|---|---|---|
| No. of inlet openings 3 | 180 | 36 | 36 | 0 | 0.50 | 0.044 | 0.63 |
| Base diameter 2 mm. | 180 | 36 | 36 | 62.8 | 0.75 | 0.067 | 0.38 |
| Base outlet diameter 1 mm. | 180 | 36 | 36 | 69.5 | 0.81 | 0.082 | 0.38 |
| Apex outlet diameter 1 mm. | 180 | 36 | 36 | 76.1 | 0.92 | 0.106 | 0.41 |
| | 180 | 36 | 36 | 77.3 | 0.98 | 0.112 | 0.42 |
| | 180 | 36 | 36 | 78.9 | 1.09 | 0.114 | 0.43 |
| | 180 | 36 | 36 | 85.0 | 1.22 | 0.126 | 0.45 |
| | 180 | 36 | 36 | 88.3 | 1.33 | 0.146 | 0.45 |
| | 180 | 36 | 36 | 92.9 | 1.50 | 0.147 | 0.46 |

+)liters per min. at 0° C, 1 atm.

Column 12, line 17 : after "and" insert --0.7% U--

Column 13, line 7 : delete second "at 3keV".

Column 13, line 16 : after "Each" delete --of--.

UNITED STATES PATENT OFFICE
CERTIFICATE OF CORRECTION

Patent No. 4,070,171      Dated January 24, 1978

Inventor(s) Nils Anders Lennart Wikdahl

It is certified that error appears in the above-identified patent and that said Letters Patent are hereby corrected as shown below:

Column 14, line 47   : "analyer" should be -- analyzer--.

Column 16, line 9    : "secnd" should be --second--

Column 16, line 33   : "sies" should be --sides--.

Signed and Sealed this

Eighth Day of August 1978

[SEAL]

Attest:

RUTH C. MASON  
Attesting Officer

DONALD W. BANNER  
Commissioner of Patents and Trademarks